Figure 1:
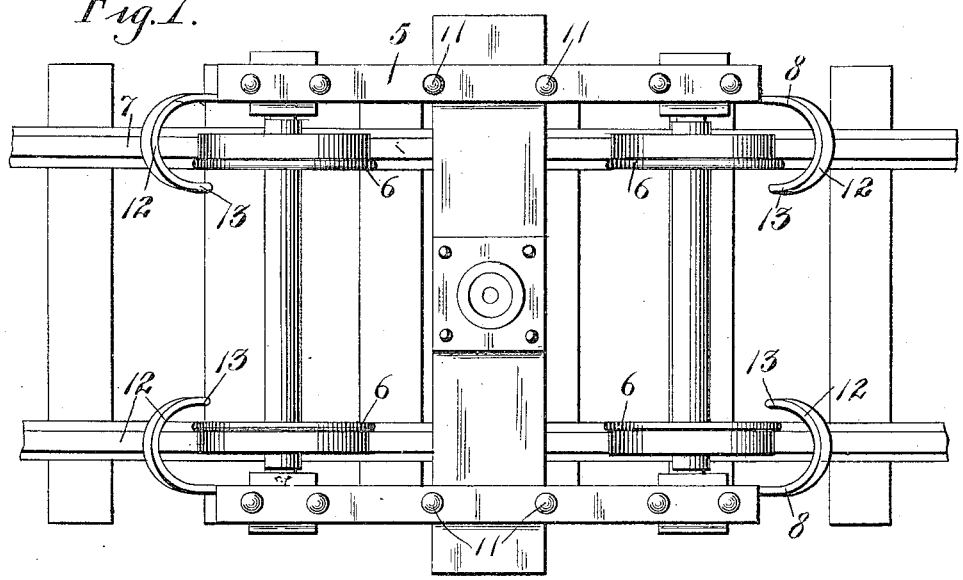

J. & J. B. NELSON & G. C. HANKS.
SAFETY GUARD FOR RAILWAY CARS.
APPLICATION FILED NOV. 19, 1908. RENEWED MAR. 18, 1910.

972,632.

Patented Oct. 11, 1910.

Witnesses
Albert L. Krey
F. O. Pauleen

Inventor
John Nelson,
John B. Nelson,
Gardner C. Hanks,
By
Attorney

THE NORRIS PETERS CO., WASHINGTON, D. C.

UNITED STATES PATENT OFFICE.

JOHN NELSON, JOHN B. NELSON, AND GARDNER C. HANKS, OF NEW ORLEANS, LOUISIANA.

SAFETY-GUARD FOR RAILWAY-CARS.

972,632.  Specification of Letters Patent.  Patented Oct. 11, 1910.

Application filed November 19, 1908, Serial No. 463,466. Renewed March 18, 1910. Serial No. 550,301.

*To all whom it may concern:*

Be it known that we, JOHN NELSON, JOHN B. NELSON, and GARDNER C. HANKS, citizens of the United States, residing at New Orleans, in the parish of Orleans, State of Louisiana, have invented certain new and useful Improvements in Safety-Guards for Railway-Cars; and we do hereby declare the following to be a full, clear, and exact description of the invention, such as will enable others skilled in the art to which it appertains to make and use the same.

The invention relates to guards and more particularly to the class of safety guards or fenders for rolling stock such as street or other railway cars.

The primary object of the invention is the provision of a safety guard adapted to be mounted on the truck frame of a car and to extend longitudinally along one side of the frame in close proximity to the track rails and having its opposite ends bent inwardly in front of the car wheels and rearwardly at the inner side thereof so as to protect a person from injury when falling in the path of movement of the car, by causing the body of such person to be thrown a distance from the car wheels to either side of the same, and thereby escape being run over by the wheels of the car.

Another object of the invention is the provision of guards mounted at opposite sides of a car truck, each guard formed of a metallic strip or bar extended beyond the length of the car truck and having its opposite ends bent inwardly and rearwardly of the car wheels to shield a person from injury by being run over by the same when falling from or standing in front of the car when the latter is in motion, and which guard will cause the person's body to be deflected midway of the track or outside of the same to either side of the path of movement of the wheels of the car.

With these and other objects in view, the invention consists in the novel construction, combination and arrangement of parts hereinafter described and illustrated in the drawings and particularly pointed out in the appended claim. However, it is to be understood that changes, variations and modifications may be resorted to, such as come properly within the scope of the appended claim without departing from the spirit of the invention.

Figure 2:
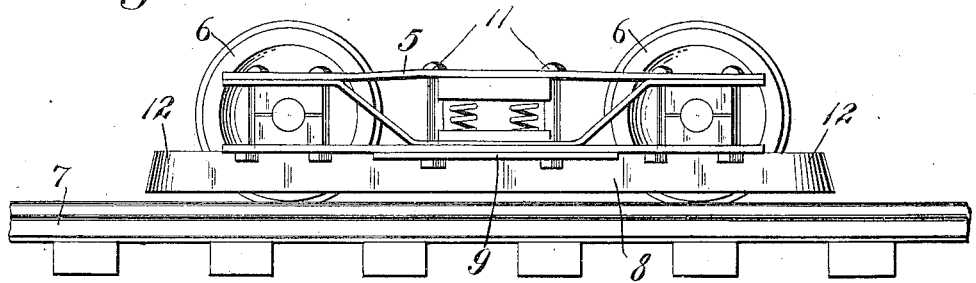
Figure 3:
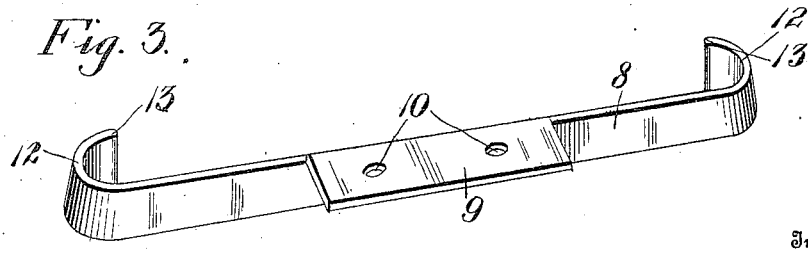

In the drawings: Figure 1 is a top plan view of a wheeled car truck in position upon a track and the guards mounted upon the same. Fig. 2 is a side elevation thereof. Fig. 3 is a detail perspective view of one of the guards or fenders.

Similar reference characters indicate corresponding parts throughout the several views in the drawings.

In the drawings, the numeral 5 designates, generally, a car truck frame having journaled therein the usual car wheels 6 adapted to travel upon the rails 7 of a track. Mounted upon the truck frame at opposite sides thereof are guards or fenders 8 each of which is formed of a metallic strip or bar, the same extending the length of the truck frame a slight distance beyond the said car wheels 6. This guard or fender has formed centrally thereon an outwardly directed flange 9 at right angles thereto and containing openings 10 through which pass fasteners 11 which secure the guard or fender in position upon the truck frame to hold the said guard or fender in close proximity to the tread of the rail of the track structure. The opposite extremities of each guard or fender 8 are bent inwardly as at 12 slightly in advance of the peripheral edges of the car wheels 6, and which ends are further bent rearwardly as at 13 at a distance slightly removed from the inner faces of the said car wheels. The said opposite extremities of the guards or fenders 8 are rearwardly inclined so as to have the lower edges thereof protrude forwardly or beyond the plane of the upper edges of the guards or fenders. It is to be understood that the guards or fenders can be made of various thicknesses to properly adapt the same to the truck frame to which they are to be attached. Furthermore, the said guards or fenders can be mounted upon the truck frame in any desirable manner other than herein described.

It is apparent that due to the opposite extremities of the guards or fenders 8 being bent inwardly and rearwardly in advance of the peripheries of the car wheels 6 to the inner sides thereof, the fenders will protect a person from injury or being run over by the car wheels by causing the body of said person to be thrown or deflected to either side of the car wheels and out of the path of movement thereof. The close arrangement of the guards or fenders with respect to the treads of the rails of the track will prevent and overcome the possibility of a person escaping the purpose of the said guards or fenders by contacting with the wheels of the car. Furthermore, due to the rearwardly directed terminals of the guards or fenders, there is no possibility of a person being dragged or carried along by the car when in motion but said terminals will deflect the person's body out of the path of movement of the car wheels and the person will thereby escape injury from the same.

What is claimed is—

The combination with a wheeled truck, of guards disposed at opposite sides of the truck, each guard comprising a strip of flat metal having a right angular extension at its upper edge secured to the truck, the opposite ends of the strip of metal being bent inwardly and rearwardly a slight distance beyond the wheel of the truck to form curved terminals disposed transversely of the treads of the wheel.

In testimony whereof, we affix our signatures in presence of two witnesses.

JOHN NELSON.
JOHN B. NELSON.
GARDNER C. HANKS.

Witnesses:
E. H. LEDOUX,
P. J. LEDOUX.